(12) United States Patent
Kitamura et al.

(10) Patent No.: US 11,384,683 B2
(45) Date of Patent: Jul. 12, 2022

(54) TURBOCHARGER AND INTERNAL COMBUSTION ENGINE

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Takao Yokoyama, Tokyo (JP); Kunihiro Tomikawa, Tokyo (JP); Makoto Ozaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 30 days.

(21) Appl. No.: 16/976,315

(22) PCT Filed: Mar. 5, 2018

(86) PCT No.: PCT/JP2018/008322
§ 371 (c)(1),
(2) Date: Aug. 27, 2020

(87) PCT Pub. No.: WO2019/171431
PCT Pub. Date: Sep. 12, 2019

(65) Prior Publication Data
US 2021/0363915 A1     Nov. 25, 2021

(51) Int. Cl.
*F02B 37/18*     (2006.01)
*F01D 9/02*      (2006.01)
(Continued)

(52) U.S. Cl.
CPC .......... *F02B 37/183* (2013.01); *F01D 9/026* (2013.01); *F01D 17/105* (2013.01); *F01N 13/10* (2013.01);
(Continued)

(58) Field of Classification Search
CPC ...... F02B 37/183; F01D 9/026; F01D 17/105; F01N 13/10; F02C 6/12; F02M 35/10157; F05D 2220/40
See application file for complete search history.

(56) References Cited

U.S. PATENT DOCUMENTS 2,981,516 A * 4/1961 Egli ................... F01D 25/08
415/203
4,725,206 A * 2/1988 Glaser .................. F01D 25/125
415/175
(Continued)

FOREIGN PATENT DOCUMENTS

DE    10 2010 013 264 A1    9/2011
GB         1 273 234           5/1972
(Continued)

OTHER PUBLICATIONS

Extended European Search Report dated Nov. 27, 2020 issued to the corresponding European Patent Application No. 18909244.8.
(Continued)

*Primary Examiner* — Audrey B. Walter
*Assistant Examiner* — Dapinder Singh
(74) *Attorney, Agent, or Firm* — Birch, Stewart, Kolasch & Birch, LLP (57) ABSTRACT

A turbocharger according to an embodiment is a turbocharger including a turbine housing for housing a turbine wheel rotary driven by an exhaust gas, a bearing housing for housing a rotational shaft on which the turbine wheel is mounted, the bearing housing being adjacent to the turbine housing, and a wastegate portion including a bypass passage and a valve body, the bypass passage allowing the exhaust gas to bypass the turbine wheel, the valve body being able to adjust a flow rate of the exhaust gas flowing through the bypass passage. In the turbine housing, a scroll passage for supplying the exhaust gas to the turbine wheel is formed by
(Continued)

casting, at least on a radially outer side of the turbine wheel. A fastening portion for fastening the turbine housing and the bearing housing is disposed on a radially outer side of the scroll passage.

11 Claims, 4 Drawing Sheets

(51) Int. Cl.
*F01D 17/10* (2006.01)
*F01N 13/10* (2010.01)
*F02C 6/12* (2006.01)
*F02M 35/10* (2006.01)

(52) U.S. Cl.
CPC ......... *F02C 6/12* (2013.01); *F02M 35/10157* (2013.01); *F05D 2220/40* (2013.01)

(56) References Cited

U.S. PATENT DOCUMENTS

| | | | |
|---|---|---|---|
| 4,786,238 A * | 11/1988 | Glaser | F01D 25/125 415/175 |
| 5,087,176 A | 2/1992 | Wieland | |
| 9,011,089 B2 | 4/2015 | Solanki et al. | |
| 2005/0069427 A1 | 3/2005 | Roemuss et al. | |
| 2013/0129502 A1 | 5/2013 | Schaefer | |
| 2013/0136578 A1 | 5/2013 | Vetter et al. | |
| 2015/0211538 A1 | 7/2015 | Aiba et al. | |
| 2016/0061208 A1 * | 3/2016 | Marques | F02B 37/183 415/148 |
| 2017/0204743 A1 | 7/2017 | Yokoyama et al. | |
| 2018/0298811 A1 * | 10/2018 | Tanigaki | F01D 17/105 |
| 2019/0063260 A1 | 2/2019 | Kitamura et al. | |

FOREIGN PATENT DOCUMENTS

| | | | |
|---|---|---|---|
| JP | 60-45722 | A | 3/1985 |
| JP | 60-113024 | A | 6/1985 |
| JP | 61-152926 | A | 7/1986 |
| JP | 11-132051 | A | 5/1999 |
| JP | 2004-92643 | A | 3/2004 |
| JP | 2012-57546 | A | 3/2012 |
| JP | 2013-533429 | A | 8/2013 |
| JP | 2014-34910 | A | 2/2014 |
| JP | 2016-173068 | A | 9/2016 |
| WO | WO 2016/071959 | A1 | 5/2016 |
| WO | WO 2017/154069 | A1 | 9/2017 |

OTHER PUBLICATIONS

International Preliminary Report on Patentability and English translation of the Written Opinion of the International Searching Authority dated Sep. 17, 2020 for Application No. PCT/JP2018/008322.
International Search Report and Written Opinion of the International Searching Authority dated May 22, 2018 for Application No. PCT/JP2018/008322.
Office Action dated Sep. 7, 2021 issued in counterpart Japanese Application No. 2020-504494 with an English Machine Translation.

* cited by examiner

TURBOCHARGER AND INTERNAL COMBUSTION ENGINE

TECHNICAL FIELD

The present disclosure relates to a turbocharger and an internal combustion engine including the same.

BACKGROUND

In a turbocharger for supercharging intake air of an internal combustion engine or the like, a turbine housing, where an exhaust gas discharged from the internal combustion engine or the like is introduced, internally forms a complicated exhaust gas flow passage such as a scroll passage, and is thus usually manufactured by casting.

Moreover, the turbocharger is controlled so as not to exceed a maximum boost pressure preset by a boost pressure. As a means for controlling the boost pressure, there is a means which includes a variable nozzle for making the flow rate of an exhaust gas flowing into a turbine wheel variable, and a wastegate valve system capable of adjusting the boost pressure by providing a bypass passage for allowing the exhaust gas to bypass the turbine wheel and adjusting the flow rate of the exhaust gas flowing through the bypass passage.

Patent Documents 1 and 2 each disclose a turbocharger including a variable nozzle mechanism, and Patent Document 3 discloses a turbocharger adopting a wastegate valve system. A turbine housing is fastened to an adjacent bearing housing by using a fastener or the like. As disclosed in each of Patent Documents 1 and 2, in the turbocharger including the variable nozzle mechanism, since the variable nozzle mechanism is disposed, the above-described fastening portion is positioned radially outward from a center. On the other hand, since the turbocharger adopting the wastegate valve system is not constrained to include the variable nozzle mechanism, the above-described fastening portion is disposed at a position close to the radial direction from the center as disclosed in Patent Document 3, with the object of downsizing the bearing housing.

CITATION LIST

Patent Literature

Patent Document 1: U.S. Pat. No. 9,011,089B
Patent Document 2: JP2014-034910A
Patent Document 3: JP2012-057546A

SUMMARY

Technical Problem

In a case in which a turbine housing is manufactured by casting, surface roughness of a wall surface forming an exhaust gas flow passage is relatively large, increasing a friction loss of an exhaust gas. Thus, the problem arises in that aerodynamic performance decreases in a scroll passage or the like, in particular. In addition, since the thickness of a wall portion is relatively large in casting, the problem arises in that a heat capacity of the wall portion increases, increasing a heat loss of the exhaust gas. In particular, in an initial-stage operation, the temperature of the exhaust gas decreases, causing a transient decrease in performance.

In order to avoid the above-described problems, manufacturing the turbine housing by sheet-metal working is considered. However, a complicated sheet-metal part needs to be prepared, and weld parts increase, resulting in an increase in cost.

In view of the above-described problems of the turbine housing manufactured by casting, an object of an embodiment is to suppress the decrease in aerodynamic performance and the increase in heat loss of the exhaust gas flowing through the turbine housing.

Solution to Problem (1) A turbocharger according to an embodiment is a turbocharger including a turbine housing for housing a turbine wheel rotary driven by an exhaust gas, a bearing housing for housing a rotational shaft on which the turbine wheel is mounted, the bearing housing being adjacent to the turbine housing, and a wastegate portion including a bypass passage and a valve body, the bypass passage allowing the exhaust gas to bypass the turbine wheel, the valve body being able to adjust a flow rate of the exhaust gas flowing through the bypass passage. In the turbine housing, a scroll passage for supplying the exhaust gas to the turbine wheel is formed by casting, at least on a radially outer side of the turbine wheel. A fastening portion for fastening the turbine housing and the bearing housing is disposed on a radially outer side of the scroll passage.

The above-described "radially outer side" means a radially outer side with respect to the above-described rotational shaft.

With the above configuration (1), since the above-described fastening portion is disposed on the radially outer side of the scroll passage, a scroll passage forming portion of the turbine housing is arranged on the inner side of the fastening portion. Therefore, a bearing-housing side facing surface of the scroll passage facing the bearing-housing side need not necessarily be constituted by a thick wall. Accordingly, it is possible to form the scroll passage by casting the turbine housing with the bearing-housing side facing surface of the scroll passage forming portion being an open surface, and arranging a thin back plate in the open surface.

Consequently, in the casted turbine housing, a polishing blade and a cutting blade can be inserted into the scroll passage, allowing cutting and polishing of a wall surface forming the scroll passage. Thus, it is possible to improve aerodynamic performance with respect to the exhaust gas by reducing surface roughness with the polishing blade, and to suppress a heat loss of the exhaust gas by reducing the thickness of the wall portion forming the scroll passage with the cutting blade. In addition, since the bearing-housing side facing surface of the scroll passage forming portion is constituted by the open surface, a core for forming the scroll passage at the time of casting is unnecessary, allowing a cost reduction of a casting process.

In the present embodiment, as described above, in the turbocharger adopting the wastegate valve system, with the object of downsizing the bearing housing, it is possible to obtain the above-described technical effect by disposing the fastening portion on the radially outer side of the scroll passage without being bound to a preconception that the fastening portion is disposed at a position close to the central part in the radial direction.

(2) In an embodiment, in the above configuration (1), a scroll passage forming portion for forming the scroll passage is configured such that a side thereof facing the bearing housing is opened, and the turbocharger includes a back plate disposed to close at least a bearing-housing side open surface of the scroll passage forming portion.

With the above configuration (2), since the scroll passage is formed by closing the above-described bearing-housing side open surface with the thin back plate, it is possible to suppress a heat-transfer amount transferred from the exhaust gas to the scroll passage forming portion. Thus, it is possible to suppress the heat loss of the exhaust gas. In addition, since the bearing-housing side facing surface of the scroll passage forming portion is constituted by the open surface, it is possible to insert the polishing blade and the cutting blade into the scroll passage, as described above. Thus, it is possible to improve aerodynamic performance with respect to the exhaust gas by reducing surface roughness with the polishing blade, and to suppress the heat loss of the exhaust gas by reducing the thickness of the wall portion forming the scroll passage with the cutting blade. In addition, since the bearing-housing side facing surface of the scroll passage forming portion is constituted by the open surface, the core for forming the scroll passage at the time of casting is unnecessary, allowing the cost reduction of the casting process.

By composing the back plate of an insulator, it is possible to effectively suppress the heat loss of the exhaust gas.

(3) In an embodiment, in the above configuration (2), a part of the back plate arranged at a closing position of the scroll passage is configured to be thicker than another part of the back plate.

With the above configuration (3), since the part of the back plate arranged at the closing position of the scroll passage is configured to be thicker than the another part of the back plate, it is possible to enhance a strength against a fluid pressure of the exhaust gas. It is also possible to suppress thermal deformation of the back plate and to maintain the shape of the scroll passage. Therefore, it is possible to maintain aerodynamic performance with respect to the exhaust gas over a long period of time during an operation.

(4) In an embodiment, in the above configuration (2) or (3), the back plate extends radially outward up to the fastening portion, the back plate having a radially outer end part fixed to the fastening portion.

With the above configuration (4), since the radially outer end part of the back plate is fixed to the fastening portion, the back plate can enhance the support strength against the fluid pressure of the exhaust gas.

(5) In an embodiment, in the above configuration (4), the fastening portion is composed of a first fastening portion disposed in the turbine housing, a second fastening portion disposed in the bearing housing, and a fastening unit for fastening the first fastening portion and the second fastening portion, and the radially outer end part of the back plate is interposed by the first fastening portion and the second fastening portion.

With the above configuration (5), since the radially outer end part of the back plate is interposed by the first fastening portion and the second fastening portion, the back plate can enhance the support strength against the fluid pressure of the exhaust gas.

(6) In an embodiment, in the above configuration (5), the second fastening portion is composed of a flange portion extending radially outward from the bearing housing.

With the above configuration (6), since the second fastening portion formed on the bearing-housing side is composed of the flange portion extending radially outward from the bearing housing, it is possible to downsize the second fastening portion.

(7) In an embodiment, in the above configuration (6), the flange portion is disposed in a circumferential entire region of the bearing housing, and the fastening portion is disposed in the circumferential entire region of the bearing housing.

With the above configuration (7), since the above-described flange portion composing the second fastening portion and the fastening portion formed by the flange portion are disposed in the circumferential entire region of the bearing housing, it is possible to further improve the support strength of the back plate against the fluid pressure of the exhaust gas.

(8) In an embodiment, in any one of the above configurations (5) to (7), the turbocharger includes an insulator with which a portion between the back plate and the second fastening portion is filled.

With the above configuration (8), since the portion between the back plate and the second fastening portion is filled with the insulator, it is possible to suppress the heat-transfer amount from the exhaust gas to the back plate and to suppress the heat loss of the exhaust gas.

(9) In an embodiment, in any one of the above configurations (5) to (8), the second fastening portion has a facing surface facing the back plate, the facing surface undergoing polishing processing so as to decrease thermal emissivity.

With the above configuration (9), since the facing surface of the second fastening portion facing the back plate undergoes polishing processing so as to decrease thermal emissivity, it is possible to increase heat reflectivity. Thus, it is possible to suppress the heat-transfer amount from the exhaust gas to the back plate and to suppress the heat loss of the exhaust gas.

(10) In an embodiment, in any one of the above configurations (5) to (9), the fastening unit is composed of a bolt, and the first fastening portion and the second fastening portion are coupled with the bolt.

With the above configuration (10), since the first fastening portion and the second fastening portion are fastened with the bolt, it is possible to enhance a fastening strength and to reduce the cost of the fastening means.

(11) An internal combustion engine according to an embodiment includes the turbocharger according to any one of the above configurations (1) to (10), the turbocharger including a compressor housing for housing the compressor wheel integrally connected to the turbine wheel via the rotational shaft, at least one cylinder, an exhaust gas pipe for introducing the exhaust gas discharged from the cylinder to the turbine housing, and an air supply pipe for supplying supply air to the cylinder via the compressor housing.

According to the internal combustion engine having the above configuration (11), with the turbocharger configured as described above, it is possible to insert the cutting blade and the polishing blade into the scroll passage after the turbine housing is casted. Thus, since it is possible to cut and polish the wall surface forming the scroll passage, it is possible to improve aerodynamic performance with respect to the exhaust gas by reducing surface roughness, and to suppress the heat loss of the exhaust gas by reducing the thickness of the wall portion forming the scroll passage. In addition, since the core for forming the scroll passage at the time of casting is unnecessary by eliminating the bearing-housing side partition wall, it is possible to reduce the cost of the casting process.

Advantageous Effects

According to an embodiment, it is possible to suppress a decrease in aerodynamic performance and a heat loss with respect to an exhaust gas flowing through a turbine housing, and to decrease a cost of manufacturing the turbine housing.

DETAILED DESCRIPTION

Some embodiments of the present invention will be described below with reference to the accompanying drawings. It is intended, however, that unless particularly specified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

FIGS. 1 to 4 show turbochargers 10 (10A, 10B, 10C, 10D) according to some embodiments.

In FIGS. 1 to 4, a housing of each of the turbochargers 10 (10A to 10D) is composed of a turbine housing 20, a bearing housing 30 adjacent to the turbine housing 20, and a compressor housing 40 adjacent to the bearing housing 30. The turbine housing 20 internally houses a turbine wheel 22 rotary driven by an exhaust gas. Inside the turbine housing 20, the bearing housing 30, and the compressor housing 40, a rotational shaft 12 is disposed over these housings and at a central part in these housings. Moreover, the turbine wheel 22 is fixed to the rotational shaft 12 in the turbine housing 20, and a compressor wheel 42 is fixed to the rotational shaft 12 in the compressor housing 40. The rotational shaft 12 is rotatably supported by a radial bearing 32 and a thrust bearing 34 disposed in the bearing housing 30.

Moreover, the turbocharger 10 includes a wastegate portion 50 capable of controlling a boost pressure of the turbocharger 10 not to exceed a preset maximum boost pressure by adjusting the flow rate of an exhaust gas e passing through the turbine wheel 22. The wastegate portion 50 includes a bypass passage 52 and a valve body 54. The bypass passage 52 communicates with an exhaust gas introduction path 26 disposed upstream of the turbine wheel 22 and an exhaust gas discharge path 28 disposed downstream of the turbine wheel 22. The valve body 54 is disposed in the bypass passage 52 and is capable of adjusting the flow rate of the exhaust gas e flowing through the bypass passage 52.

The valve body 54 is operated by an actuator (not shown) to adjust the flow rate of the exhaust gas e flowing through the bypass passage 52, making it possible to control the boost pressure of the turbocharger 10 not to exceed the preset maximum boost pressure.

In an embodiment, the valve body 54 may be a valve body operated by the actuator (not shown) and has a functional possibility of just opening/closing the bypass passage 52.

Moreover, the turbine housing 20 of the turbocharger 10 is manufactured by casting. At the time of casting, a scroll passage 24 for supplying the exhaust gas e to the turbine wheel 22 is formed on the radially outer side of the rotational shaft 12 than the turbine wheel 22. The scroll passage 24 communicates with the exhaust gas introduction path 26, and supplies the exhaust gas introduced from the exhaust gas introduction path 26 to the turbine wheel 22 via a narrowed portion 23 formed in the turbine wheel 22.

Furthermore, a fastening portion 60 for fastening the turbine housing 20 and the bearing housing 30 is disposed in a part positioned on the radially outer side of the scroll passage 24.

With the above configuration, since the fastening portion 60 is disposed on the radially outer side of the scroll passage 24, a scroll passage forming portion 25 (a wall portion forming the scroll passage 24) of the turbine housing 20 is arranged on the inner side of the fastening portion 60. Therefore, a bearing-housing side facing surface of the scroll passage 24 facing the bearing-housing side need not necessarily be constituted by a thick wall. Accordingly, it is possible to form the scroll passage 24 by casting the turbine housing 20 with the bearing-housing side facing surface of the scroll passage forming portion 25 being an open surface 25c, and arranging a thin back plate 14 in the open surface 25c.

Consequently, in the casted turbine housing 20, a polishing blade and a cutting blade can be inserted into the scroll passage 24, allowing cutting and polishing of a wall surface forming the scroll passage 24. Thus, it is possible to improve aerodynamic performance with respect to the exhaust gas by reducing surface roughness with the polishing blade, and to suppress a heat loss of the exhaust gas by reducing the thickness of the wall portion forming the scroll passage 24 with the cutting blade. In addition, since the bearing-housing side facing surface of the scroll passage forming portion 25 is constituted by the open surface 25c, a core for forming the scroll passage 24 at the time of casting is unnecessary, allowing a cost reduction of a casting process.

As in the present embodiment, in the turbocharger 10 adopting the wastegate valve system, with the object of downsizing the bearing housing 30, it is possible to obtain the above-described technical effect by disposing the fastening portion 60 on the radially outer side of the scroll passage 24 without being bound to a preconception that the fastening portion 60 is disposed at a position close to the central part (rotational shaft 12) in the radial direction.

Figure 1:
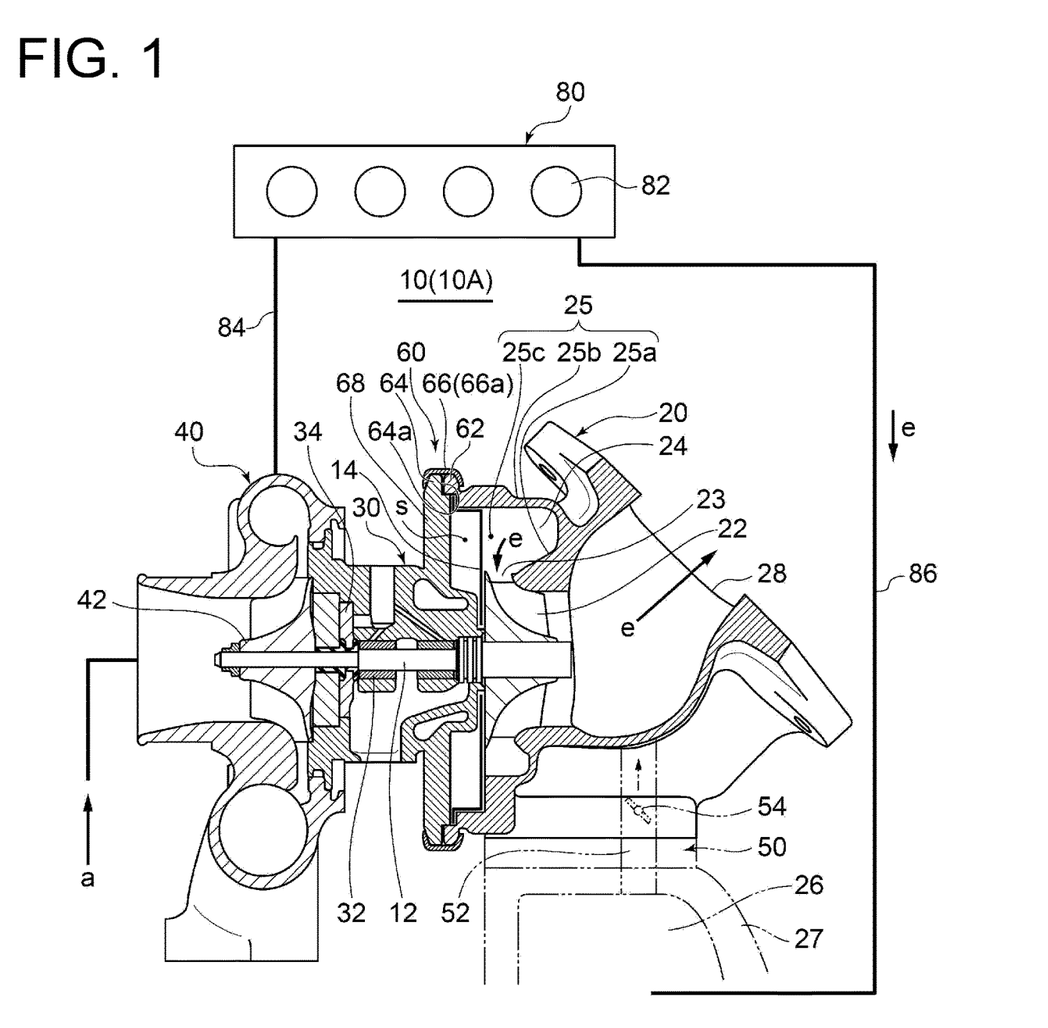
FIG. 1 is a vertical cross-sectional view of a turbocharger according to an embodiment.

In an embodiment, as shown in FIG. 1, the exhaust gas introduction path 26 is formed in a housing 27 connected to the turbine housing 20. The housing 27 is connected to an exhaust gas pipe 86 introduced from an internal combustion engine 80. The exhaust gas generated in the internal combustion engine 80 is introduced to the exhaust gas introduction path 26 via the exhaust gas pipe 86.

In an embodiment, the fastening portion 60 is disposed in a radially outermost part of the turbine housing 20 and the bearing housing 30. Thus, the fastening portion 60 can be arranged on the radially outer side of the scroll passage 24.

In an embodiment, as shown in FIG. 1, the scroll passage forming portion 25 includes only a turbine-housing side partition wall 25a and a radially outer partition wall 25b, and is opened on the bearing-housing side, thereby forming the bearing-housing side open surface 25c. The back plate 14 is disposed so as to close at least the bearing-housing side open surface 25c.

In the present embodiment, the scroll passage 24 is formed by closing the bearing-housing side open surface 25c with the back plate 14. Therefore, it is possible to suppress a heat-transfer amount transferred from the exhaust gas to the scroll passage forming portion 25 by reducing the thickness of the back plate 14, making it possible to suppress the heat loss of the exhaust gas. In addition, since the bearing-housing side facing surface of the scroll passage forming portion 25 is constituted by the open surface 25c, it is possible to insert the polishing blade and the cutting blade into the scroll passage 24, as described above. Thus, it is possible to improve aerodynamic performance with respect to the exhaust gas by reducing surface roughness with the polishing blade, and to suppress the heat loss of the exhaust gas by reducing the thickness of the wall portion forming the scroll passage with the cutting blade. In addition, since the core for forming the scroll passage 24 at the time of casting is unnecessary by constituting the bearing-housing side facing surface of the scroll passage forming portion 25 by the open surface 25c, it is possible to reduce the cost of the casting process.

In an embodiment, it is possible to further suppress the heat loss of the exhaust gas by composing the back plate 14 of a high-strength material having high thermal insulation performance.

In an embodiment, as shown in FIG. 1, a radially inner end of the back plate 14 is inserted into a gap formed between the turbine wheel 22 and the bearing housing 30, and is supported by the turbine housing 20 and the bearing housing 30. Thus, it is possible to enhance a support strength of the back plate 14.

In an embodiment, the back plate 14 has a circular hole formed at the center thereof, into which the rotational shaft 12 is inserted, and is constituted by a circular plate-like body arranged so as to surround the rotational shaft 12.

In an embodiment, the back plate 14 is arranged so as to cover at least the bearing-housing side open surface 25c.

In an embodiment, as shown in FIG. 1, the back plate 14 is arranged so as to cover the entire surface of the turbine housing 20 substantially facing the bearing-housing side including the bearing-housing side open surface 25c and a back-surface side of the turbine wheel 22 as well. Thus, it is possible to effectively suppress the heat loss of the exhaust gas.

In an embodiment, as shown in FIG. 1, the back plate 14 extends radially outward up to the fastening portion 60, and a radially outer end part of the back plate 14 is fixed to the fastening portion 60.

According to the present embodiment, since the radially outer end part of the back plate 14 is fixed to the fastening portion 60, the back plate 14 can enhance the support strength against a fluid pressure of the exhaust gas.

In an embodiment, as shown in FIG. 1, the fastening portion 60 is composed of a first fastening portion 62 disposed in the turbine housing 20, a second fastening portion 64 disposed in the bearing housing 30, and a fastening unit 66 for fastening the first fastening portion 62 and the second fastening portion 64. The radially outer end part of the back plate 14 is interposed by the first fastening portion 62 and the second fastening portion 64.

According to the present embodiment, since the radially outer end part of the back plate 14 is interposed by the first fastening portion 62 and the second fastening portion 64, the back plate 14 can enhance the support strength against the fluid pressure of the exhaust gas.

In an embodiment, a space S of a donut shape is formed between the back plate 14 and the second fastening portion 64.

In an embodiment, the space s is formed at a position facing the scroll passage 24 via the back plate 14.

Figure 2:
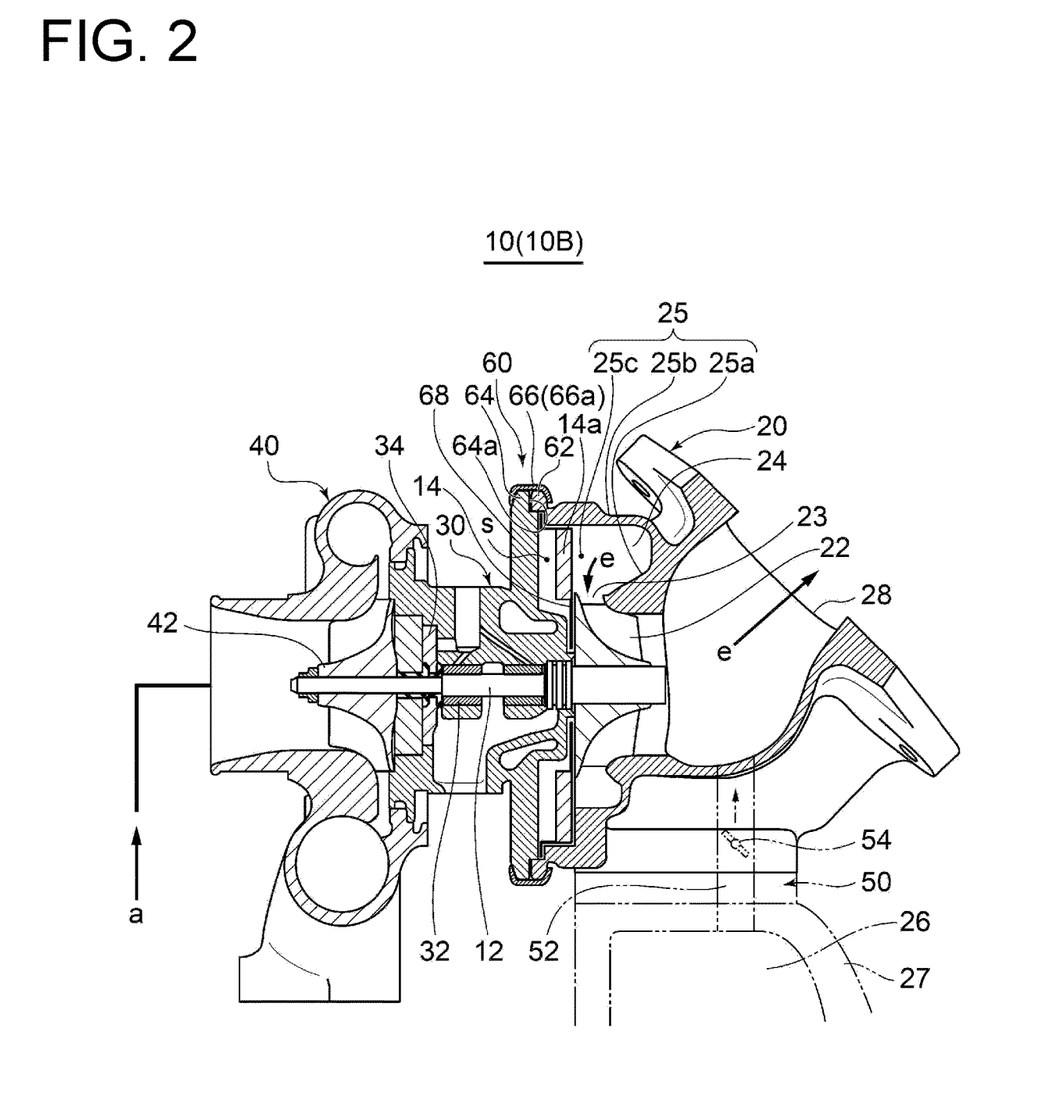
FIG. 2 is a vertical cross-sectional view of the turbocharger according to an embodiment.

In an embodiment, as shown in FIG. 2, a part 14a of the back plate 14 arranged at a closing position of the scroll passage 24 is configured to be thicker than another part of the back plate 14.

According to the present embodiment, since the part 14a closing the scroll passage 24 is configured to be thicker than the another part, it is possible to obtain a strength that can resist the fluid pressure of the exhaust gas. It is also possible to suppress thermal deformation of the back plate 14 and to maintain the shape of the scroll passage 24. Therefore, it is possible to maintain aerodynamic performance with respect to the exhaust gas over a long period of time during an operation.

In an embodiment, as shown in FIG. 2, the thick part 14a is arranged so as to close the bearing-housing side open surface 25c. Thus, the thick part 14a can form the scroll passage 24 by the turbine-housing side partition wall 25a and the radially outer partition wall 25b of the scroll passage forming portion 25.

In an embodiment, the thick part 14a is constituted by the circular plate-like body of the donut shape arranged so as to close the bearing-housing side open surface 25c.

In an embodiment, the thick part 14a is arranged in the space S of the donut shape formed between the back plate 14 and the second fastening portion 64.

In an embodiment, as described above, the space s is formed at the position facing the scroll passage 24 via the back plate 14, and the thick part 14a is arranged in the space s.

In an embodiment, as shown in FIG. 1, the first fastening portion 62 is disposed in the radially outermost part of the turbine housing 20, and the second fastening portion 64 is disposed in the radially outermost part of the bearing housing 30. Then, the fastening unit 66 is composed of a coupling 66 (66a), and the first fastening portion 62 and the second fastening portion 64 are fastened by being tightened from the outside with the coupling 66 (66a).

In an embodiment, as shown in FIG. 1, a recess 64a is formed in the second fastening portion 64, and at least a part of the first fastening portion 62 is configured to be engageable with the recess 64a. Thus, positioning between the first fastening portion 62 and the second fastening portion 64 is facilitated.

In an embodiment, as shown in FIG. 1, the second fastening portion 64 formed in the bearing housing 30 is composed of a flange portion 68 extending radially outward from the bearing housing 30.

According to the present embodiment, since the second fastening portion 64 is composed of the flange portion 68 extending radially outward from the bearing housing 30, it is possible to downsize the bearing housing 30.

In an embodiment, as shown in FIG. 1, the flange portion 68 is disposed in a circumferential entire region of the bearing housing 30, and the fastening portion 60 is disposed in the circumferential entire region of the bearing housing 30.

According to the present embodiment, since the flange portion 68 composing the second fastening portion 64 and the fastening portion 60 including the flange portion 68 are disposed in the circumferential entire region of the bearing housing 30, it is possible to further improve the support strength of the back plate 14.

Figure 3:
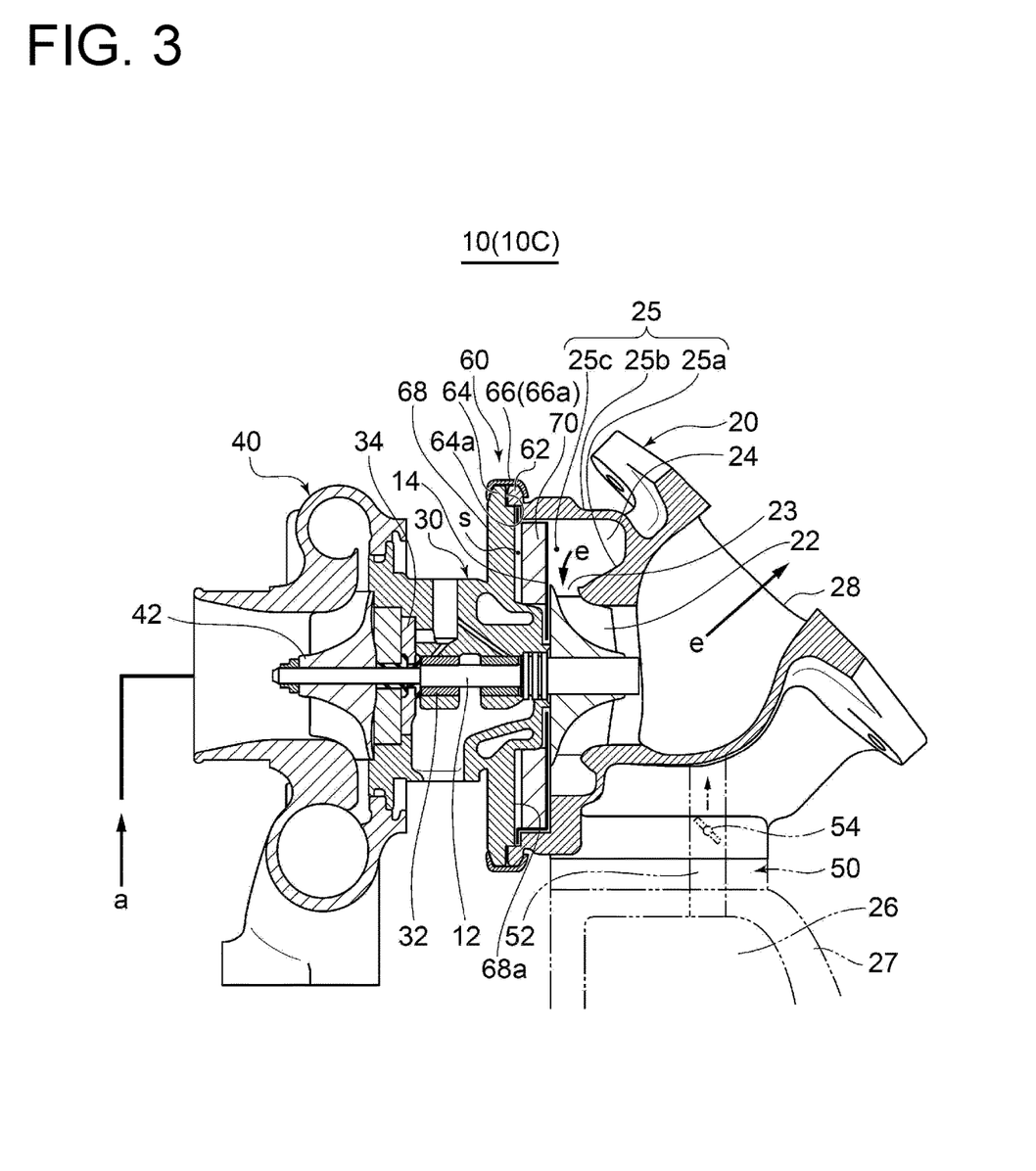
FIG. 3 is a vertical cross-sectional view of the turbocharger according to an embodiment.

In an embodiment, as shown in FIG. 3, a portion between the back plate 14 and the second fastening portion 64 is filled with an insulator 70.

According to the present embodiment, since the portion between the back plate 14 and the second fastening portion 64 is filled with the insulator 70, it is possible to suppress the heat loss of the exhaust gas.

In an embodiment, the first fastening portion 62 extends between the back plate 14 and the bearing housing in the axial direction of the rotational shaft 12. Thus, it is possible to form the space s on the inner side of the first fastening portion 62. Since the space s is formed, it is possible to ensure a space to be filled with the insulator 70.

In an embodiment, the space is filled with the insulator 70 whose thermal conductivity is not greater than 0.1 W/m·K at normal temperature. Thus, it is possible to effectively suppress heat transfer from the exhaust gas to the back plate 14, and to effectively suppress the heat loss of the exhaust gas.

In an embodiment, as shown in FIG. 3, the space s of the donut shape is formed at the radially outer position corresponding to the scroll passage 24 between the back plate 14 and the second fastening portion 64, and the space s is filled with the insulator 70 of a donut shape. Thus, it is possible to effectively suppress the heat loss of the exhaust gas flowing through the scroll passage 24.

In an embodiment, a facing surface 68a of the second fastening portion 64 (for example, the flange portion 68) facing the back plate 14 undergoes polishing processing so as to decrease thermal emissivity.

According to the present embodiment, since the facing surface of the second fastening portion 64 facing the back plate 14 has a surface low in thermal emissivity, it is possible to increase heat reflectivity. Thus, it is possible to reduce the heat-transfer amount from the exhaust gas to the back plate 14, making it possible to suppress the heat loss of the exhaust gas.

Figure 4:
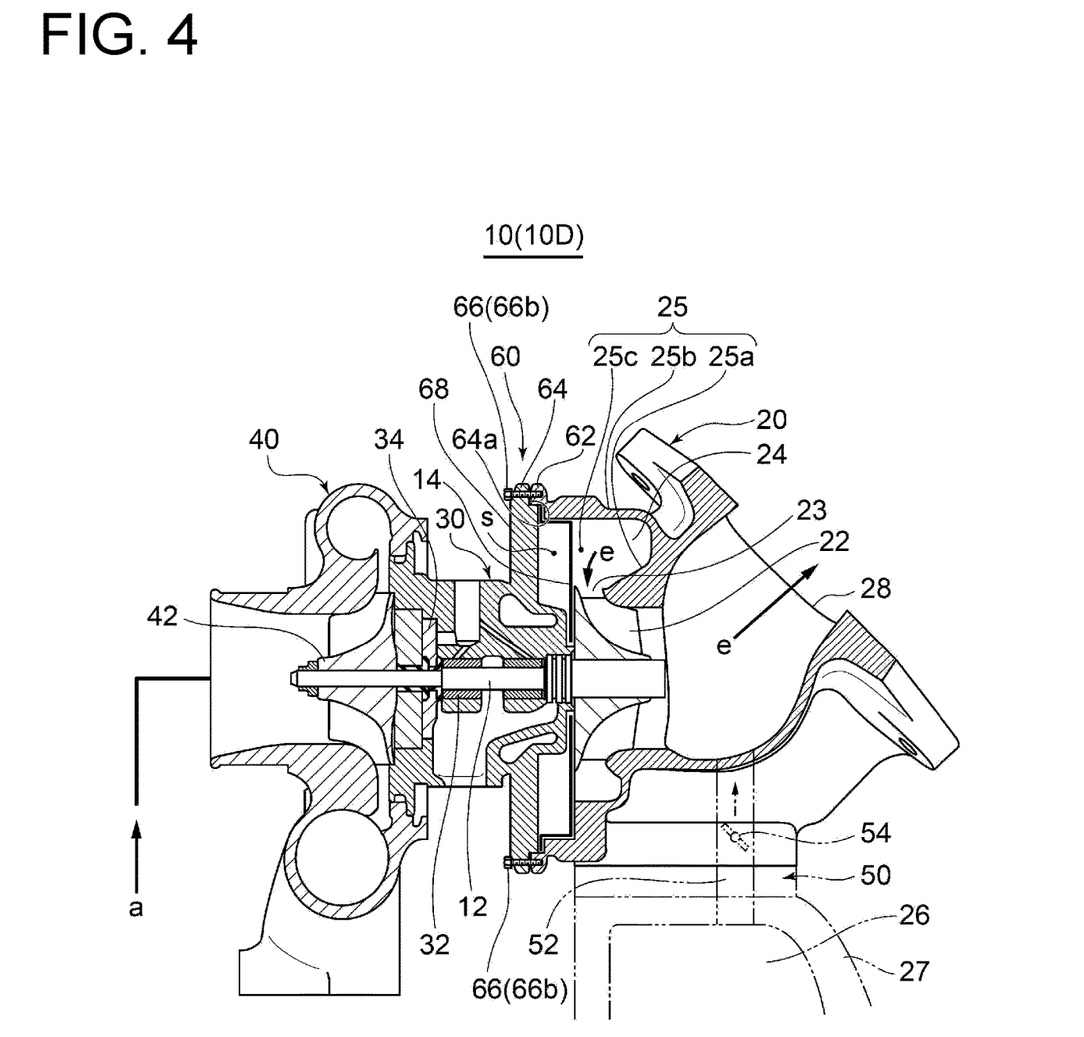
FIG. 4 is a vertical cross-sectional view of the turbocharger according to an embodiment.

In an embodiment, as shown in FIG. 4, the fastening unit 66 is composed of a bolt 66 (66b), and the first fastening portion 62 and the second fastening portion 64 are coupled with the bolt.

According to the present embodiment, since the first fastening portion 62 and the second fastening portion 64 are fastened with the bolt 66 (66b), it is possible to enhance a fastening strength of the fastening portion 60 and to reduce the cost of the fastening means, as well as to increase the freedom of an assembly method of the turbocharger 10.

In an embodiment, as shown in FIG. 4, the bolt 66 (66b) is constituted by a one-side fastening bolt. Moreover, in another embodiment, the bolt 66 (66b) is constituted by a double-side fastening bolt.

As shown in FIG. 1, the internal combustion engine 80 according to an embodiment includes the turbocharger 10 having the above-described configuration. The turbocharger 10 includes the compressor housing 40 which incorporates the compressor wheel 42 integrally connected to the turbine wheel 22 via the rotational shaft 12. Furthermore, the internal combustion engine 80 includes at least one combustion cylinder 82, the exhaust gas pipe 86 for introducing the exhaust gas e discharged from the combustion cylinder 82 to the turbine housing 20, and an air supply pipe 84 for supplying supply air 'a' to the combustion cylinder 82 via the compressor housing 40.

According to the above configuration, with the turbocharger 10 configured as described above, it is possible to insert the cutting blade and the polishing blade into the scroll passage 24 from the outside after the turbine housing 20 is casted. Thus, it is possible to cut and polish the wall surfaces (the turbine-housing side partition wall 25a, the radially outer partition wall 25b, and the like) forming the scroll passage 24, making it possible to reduce surface roughness of these wall surfaces to improve aerodynamic performance, and to reduce the thickness of these wall portions to suppress the heat loss of the exhaust gas e. In addition, since the core for forming the scroll passage 24 at the time of casting is unnecessary by eliminating the bearing-housing side partition wall to form the open surface 25c, it is possible to reduce the cost of the casting process.

INDUSTRIAL APPLICABILITY

According to an embodiment, it is possible to suppress a decrease in aerodynamic performance and an increase in heat loss of an exhaust gas flowing through a turbine housing composing the turbocharger, as well as to improve thermal efficiency and performance of an internal combustion engine including the turbocharger.

REFERENCE SIGNS LIST 10 (10A, 10B, 10C, 10D) Turbocharger
12 Rotational shaft
14 Back plate
14a Thick part
20 Turbine housing
22 Turbine wheel
23 Narrowed portion
24 Scroll passage
25 Scroll passage forming portion
25a Turbine-housing side partition wall
25b Radially outer partition wall
25c Bearing-housing side open surface
26 Exhaust gas introduction path
27 Housing
28 Exhaust gas discharge path
30 Bearing housing
32 Radial bearing
34 Thrust bearing
40 Compressor housing
42 Compressor wheel
50 Wastegate portion
52 Bypass passage
54 Valve body
60 Fastening portion
62 First fastening portion
64 Second fastening portion
64a Recess
66 Fastening unit
66 (66a) Coupling
66 (66b) Bolt
68 Flange portion
68a Facing surface
70 Insulator
80 Internal combustion engine 82 Combustion cylinder
84 Air supply pipe
86 Exhaust gas pipe
a Supply air
g Exhaust gas
s Space

The invention claimed is:

1. A turbocharger comprising:
a turbine housing for housing a turbine wheel rotary driven by an exhaust gas, the turbine housing being casting component;
a bearing housing for housing a rotational shaft on which the turbine wheel is mounted, the bearing housing being adjacent to the turbine housing; and
a waste gate portion including a bypass passage and a valve body, the bypass passage allowing the exhaust gas to bypass the turbine wheel, the valve body being able to adjust a flow rate of the exhaust gas flowing through the bypass passage,
wherein, in the turbine housing, a scroll passage for supplying the exhaust gas to the turbine wheel is formed, at least on a radially outer side of the turbine wheel, and
wherein a fastener fastening the turbine housing and the bearing housing is disposed in a circumferential entire region of the bearing housing, on a radially outer side of the scroll passage,
wherein the fastener comprises:
a first flange disposed in the turbine housing,
a second flange disposed in the bearing housing; and
a coupling fastening the first flange and the second flange together, and
wherein the second flange extends radially outward from an outer peripheral surface of the bearing housing, the outer peripheral surface being located radially inside a center of the scroll passage.

2. The turbocharger according to claim 1,
wherein a wall forming a scroll passage configured such that a side thereof facing the bearing housing is opened, and
wherein the turbocharger includes a back plate disposed to close at least a bearing-housing side open surface of the wall.

3. The turbocharger according to claim 2,
wherein a part of the back plate arranged at a closing position of the scroll passage is configured to be thicker than another part of the back plate.

4. The turbocharger according to claim 2,
wherein the back plate extends radially outward up to the fastener, the back plate having a radially outer end part fixed to fastener.

5. The turbocharger according to claim 4,
wherein the radially outer end part of the back plate is interposed by the first flange and the second flange.

6. The turbocharger according to claim 5,
wherein the second flange extends radially outward from the bearing housing.

7. The turbocharger according to claim 6,
wherein the fastener is disposed in the circumferential entire region of the bearing housing, and
wherein the fastener is disposed in the circumferential entire region of the bearing housing.

8. The turbocharger according to claim 5, further comprising:
an insulator with which a portion between the back plate and the second flange is filled.

9. The turbocharger according to claim 5,
wherein the second flange has a facing surface facing the back plate, the facing surface undergoing polishing processing so as to decrease thermal emissivity.

10. The turbocharger according to claim 5,
wherein the coupling is composed of a bolt, and
wherein the first flange and the second flange are coupled with the bolt.

11. An internal combustion engine comprising:
the turbocharger according to claim 1, the turbocharger including:
a compressor wheel integrally connected to the turbine wheel via the rotational shaft; and
a compressor housing for housing the compressor wheel;
at least one cylinder;
an exhaust gas pipe for introducing the exhaust gas discharged from the cylinder to the turbine housing; and
an air supply pipe for supplying supply air to the cylinder via the compressor housing.

* * * * *